United States Patent
Oji (10) Patent No.: US 10,814,678 B2
(45) Date of Patent: *Oct. 27, 2020

(54) TIRE

(71) Applicant: Sumitomo Rubber Industries, Ltd., Kobe-shi, Hyogo (JP)

(72) Inventor: Takuya Oji, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 532 days.

This patent is subject to a terminal disclaimer.

(21) Appl. No.: 15/636,104

(22) Filed: Jun. 28, 2017

(65) Prior Publication Data

US 2018/0015790 A1 Jan. 18, 2018

(30) Foreign Application Priority Data

Jul. 12, 2016 (JP) .................................. 2016-137934

(51) Int. Cl.
*B60C 11/13* (2006.01)
*B60C 11/12* (2006.01)
(Continued)

(52) U.S. Cl.
CPC ...... *B60C 11/1323* (2013.01); *B60C 11/0309* (2013.01); *B60C 11/047* (2013.01);
(Continued)

(58) Field of Classification Search
CPC ............. B60C 11/1315; B60C 11/1323; B60C 11/0309; B60C 11/1353; B60C 11/1263;
(Continued)

(56) References Cited

U.S. PATENT DOCUMENTS

| 4,446,901 A | 5/1984 | Endo et al. |
| 5,535,798 A * | 7/1996 | Nakamura ......... B60C 11/0309 152/209.21 |

(Continued)

FOREIGN PATENT DOCUMENTS

| CN | 101472749 A | 7/2009 |
| EP | 0520755 A1 | 12/1992 |

(Continued)

OTHER PUBLICATIONS

Machine translation of JP60-193704 (no date).*
Extended European Search Report for European Application No. 17178609.8, dated Nov. 20, 2017.

*Primary Examiner* — Steven D Maki
*Assistant Examiner* — Philip N Schwartz
(74) *Attorney, Agent, or Firm* — Birch, Stewart, Kolasch & Birch, LLP (57) ABSTRACT

A tire comprises a tread portion 2 comprising a shoulder main groove 5 extending on a side of a tread edge Te and comprising inner and outer groove walls 11 and 12. The inner groove wall 11 has an angle θ1 with respect to a tread normal line in a cross section of the shoulder main groove 5 periodically increasing and decreasing in a tire circumferential direction so as to comprise concave and convex wall portions 16 and 17 arranged alternately in the tire circumferential direction. The outer groove wall 12 has an angle θ2 with respect to a tread normal line in the cross section periodically increasing and decreasing in the tire circumferential direction so as to comprise convex and concave wall portions 22 and 21 arranged alternately in the tire circumferential direction. The angle θ2 is larger than the angle θ1 in any cross section of the groove.

8 Claims, 6 Drawing Sheets

(51) Int. Cl.
  *B60C 11/04* (2006.01)
  *B60C 11/03* (2006.01)
(52) U.S. Cl.
  CPC ........ *B60C 11/125* (2013.01); *B60C 11/1263* (2013.01); *B60C 11/1353* (2013.01); *B60C 11/045* (2013.01); *B60C 2011/0346* (2013.01); *B60C 2011/0365* (2013.01); *B60C 2011/0369* (2013.01); *B60C 2011/1361* (2013.01); *B60C 2200/06* (2013.01)
(58) Field of Classification Search
  CPC ... B60C 11/125; B60C 11/047; B60C 11/035; B60C 11/0083; B60C 11/01; B60C 11/03; B60C 11/0311; B60C 11/0306; B60C 2011/1361; B60C 2011/0346; B60C 2011/0365; B60C 2011/0369; B60C 2011/0388; B60C 2200/06
  See application file for complete search history.

(56) References Cited

U.S. PATENT DOCUMENTS

2007/0151645 A1\* 7/2007 Mathews ............ B60C 11/0309
  152/209.18
2016/0318352 A1\* 11/2016 Hibino ................ B60C 11/1263

FOREIGN PATENT DOCUMENTS

| EP | 2949482 A | 12/2015 | |
|---|---|---|---|
| JP | 60193704 A | \* 10/1985 | ......... B60C 11/0309 |
| JP | 2007-131217 A | 5/2007 | |
| TW | 201406570 A | 2/2014 | |

\* cited by examiner

TIRE

TECHNICAL FIELD

The present invention relates to a tire provided with shoulder main grooves and more particularly to a tire capable of suppressing tear damage (tear) of shoulder land regions positioned outside the shoulder main grooves.

BACKGROUND ART

In a tire having shoulder main grooves, a large tire load is likely to be applied to shoulder land regions on outer sides in a tire axial direction of the shoulder main grooves in accelerating condition or during cornering. In a heavy-duty tire supporting a particularly large tire load, uneven wear of the shoulder land regions and cracks of groove bottom surfaces of the shoulder main grooves are likely to occur. Further, these cracks gradually develop as running distance increases, consequently so-called rib tears which are partial tears of the shoulder land regions are likely to occur.

For example, Japanese unexamined Patent Application Publication No. 2007-131217 has proposed a tire in which inner groove walls and outer groove walls of the shoulder main grooves are formed in a wavy shape in a tire circumferential direction. The shoulder main grooves configured as such make it easy for recessed portions of the groove walls to deform relatively in the tire circumferential direction, therefore, it is possible that stress concentration on the shoulder land regions is moderated. Although the tire disclosed in Japanese Unexamined Patent Application Publication No. 2007-131217 has a certain effect on suppressing the rib tears, it is not sufficient and there is room for further improvement.

SUMMARY OF THE INVENTION

The present invention was made in view of the above, and a primary object thereof is to provide a tire capable of suppressing the cracks of the groove bottom surfaces of the shoulder main grooves and therefore suppressing the tears of the shoulder land regions by improving the groove walls of the shoulder main grooves.

In one aspect of the present invention, a tire comprises a tread portion comprising a shoulder main groove extending continuously in a tire circumferential direction on a side of a tread edge, the shoulder main groove comprising an inner groove wall on an inner side in a tire axial direction and an outer groove wall on an outer side in the tire axial direction, the inner groove wall having an angle $\theta 1$ with respect to a tread normal line of the inner groove wall in a cross section of the shoulder main groove periodically increasing and decreasing in the tire circumferential direction so that the inner groove wall comprises concave wall portions and convex wall portions arranged alternately in the tire circumferential direction, the concave wall portions of the inner groove wall being concave in a direction away from a groove center of the shoulder main groove, the convex wall portions of the inner groove wall being convex in a direction approaching the groove center of the shoulder main groove, the outer groove wall having an angle $\theta 2$ with respect to a tread normal line of the outer groove wall in the cross section of the shoulder main groove periodically increasing and decreasing in the tire circumferential direction so that the outer groove wall comprises convex wall portions and concave wall portions arranged alternately in the tire circumferential direction, the convex wall portions of the outer groove wall facing the concave wall portions of the inner groove wall and convex in a direction approaching the groove center of the shoulder main groove, the concave wall portions of the outer groove wall facing the convex wall portions of the inner groove wall and concave in a direction away from the groove center of the shoulder main groove, and the angle $\theta 2$ of the outer groove wall being larger than the angle $\theta 1$ of the inner groove wall in any cross section of the shoulder main groove.

In another aspect of the invention, it is preferred that the shoulder main groove comprises groove edges each extending straight in the tire circumferential direction, an inner groove bottom edge, where a groove bottom surface intersects with the inner groove wall, extending in a wavy shape in the tire circumferential direction, and an outer groove bottom edge, where the groove bottom surface intersects with the outer groove wall, extending in the tire circumferential direction in a wavy shape with a same phase as the inner groove bottom edge.

In another aspect of the invention, it is preferred that the outer groove bottom edge has an amplitude larger than that of the inner groove bottom edge.

In another aspect of the invention, it is preferred that a difference between the angle $\theta 2$ and the angle $\theta 1$ is in a range of from 2 to 13 degrees.

In another aspect of the invention, it is preferred that the angle $\theta 1$ is in a range of from 7 to 10 degrees.

In another aspect of the invention, it is preferred that the angle $\theta 2$ is in a range of from 12 to 20 degrees.

DESCRIPTION OF THE PREFERRED EMBODIMENT

An embodiment of the present invention will now be described in conjunction with accompanying drawings.

Figure 1:
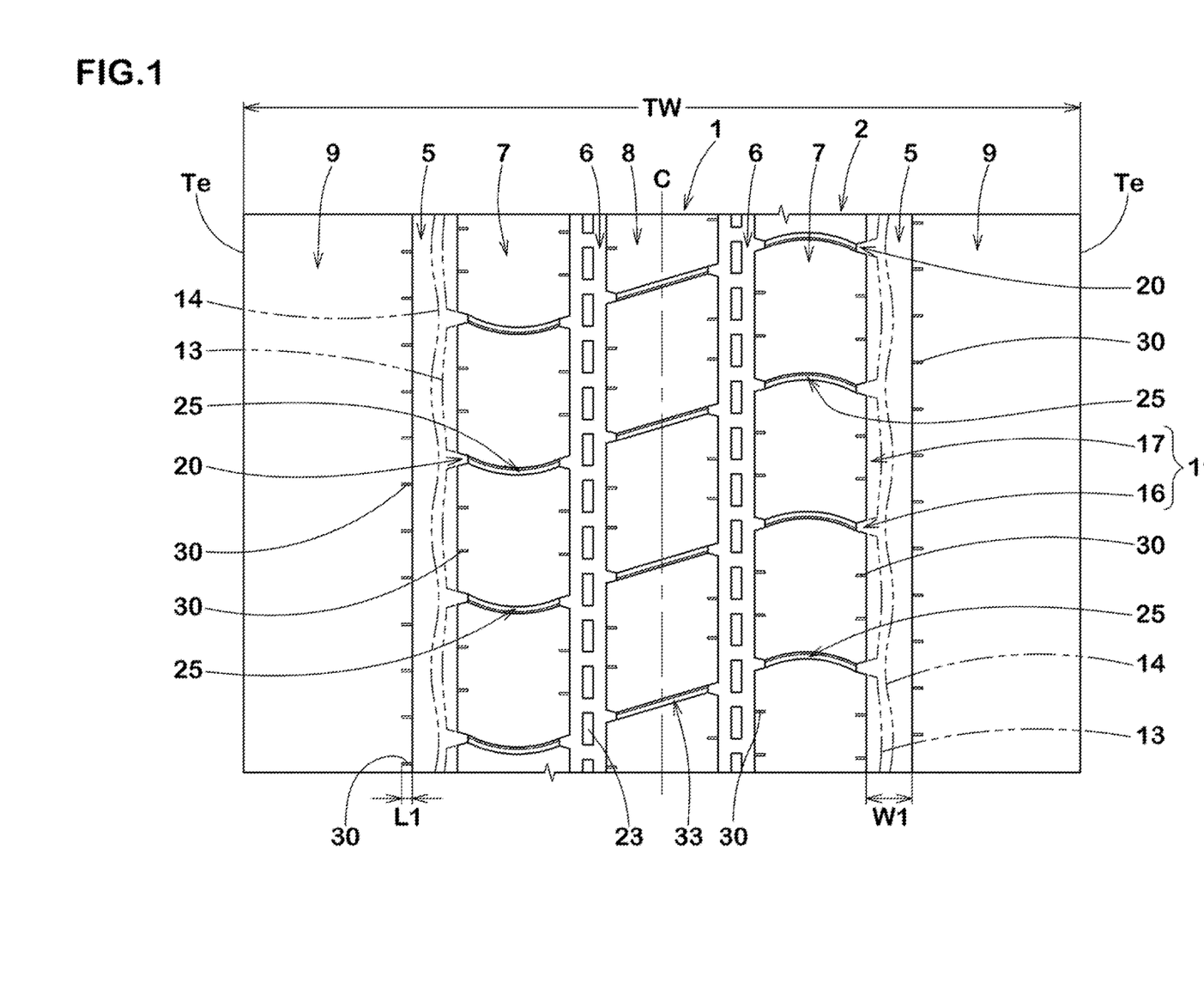
FIG. 1 is a development view of a tread portion of a tire as an embodiment of the present invention.

FIG. 1 is an enlarged view of a tread portion 2 of a tire 1 as an embodiment of the present invention. The tire 1 in this embodiment can be used for various tires such as a pneumatic tire for a passenger car and for heavy duty and a non-pneumatic tire which is not filled with pressurized air, for example. The tire 1 in this embodiment is suitably used, for example, as a pneumatic tire for heavy duty.

As shown in FIG. 1, the tread portion 2 of the tire 1 is provided with a pair of shoulder main grooves 5 extending continuously in the tire circumferential direction on sides of tread edges Te.

The "tread edges Te" are defined as axially outermost ground contacting positions when the tire 1 in a standard state is in contact with a flat surface with zero camber angle by being loaded with a standard tire load. The standard state is a state in which the tire 1 is mounted on a standard rim (not shown), inflated to a standard pressure, and loaded with no tire load.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

Each of the shoulder main grooves 5 in this embodiment is arranged closest to the tread edges Te and extends straight, for example. Shoulder land regions 9 are each adjacently provided to the shoulder main grooves 5 on outer sides thereof in the tire axial direction. Each of the shoulder land regions 9 is provided between the shoulder main groove 5 and the tread edge Te. middle land regions 7 are adjacently provided to the shoulder main grooves 5 on inner sides thereof in the tire axial direction.

It is preferred that groove widths W1 of the shoulder main grooves 5 are, for example, in a range of from 3.0% to 7.0% of tread width TW. The tread width TW is a distance in the tire axial direction between the tread edges Te of the tire 1 in the standard state. It is preferred that groove depths of the shoulder main grooves 5 are, for example, in a range of from 10 to 25 mm in a case of a pneumatic tire for heavy duty.

Figure 2:
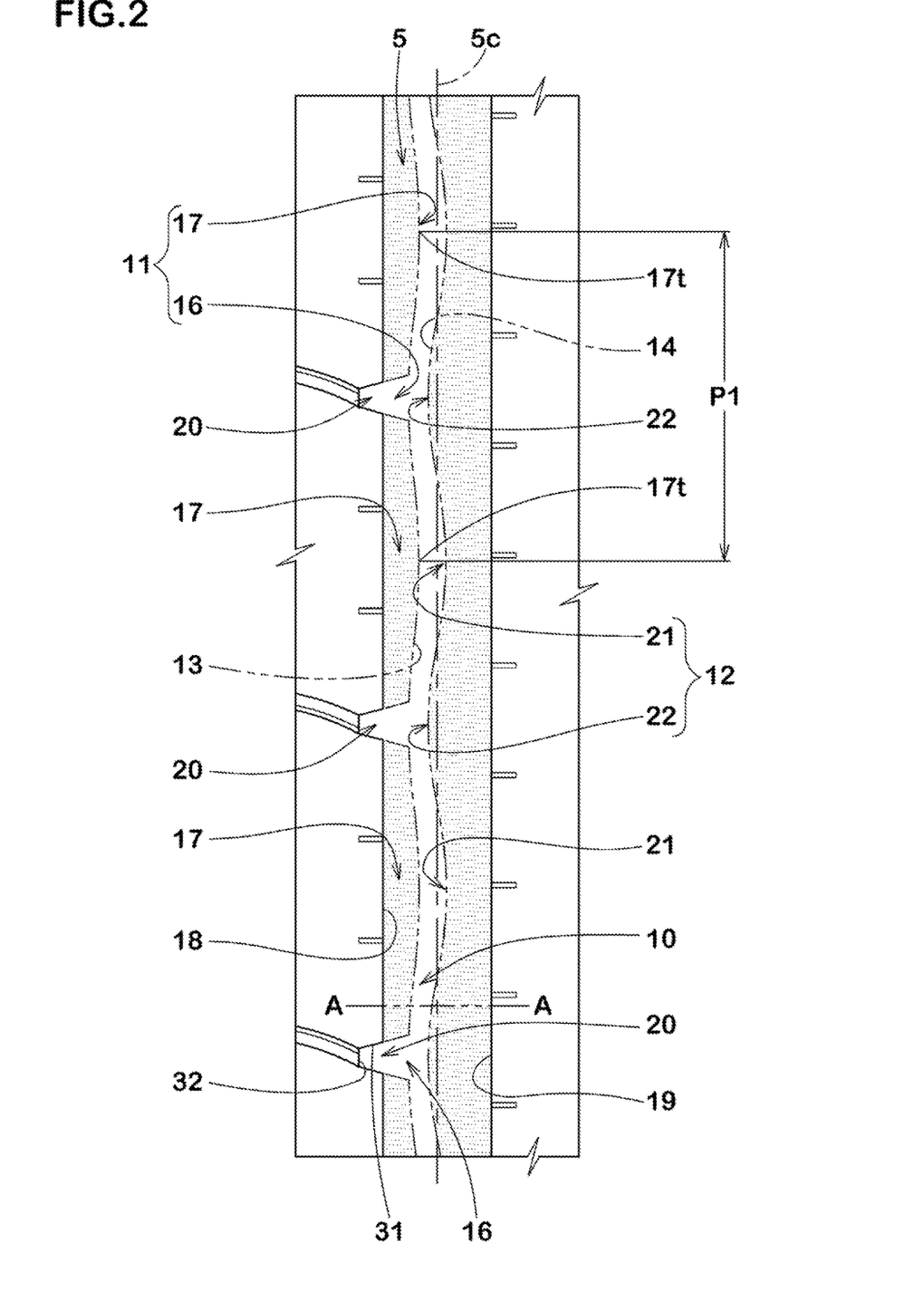
FIG. 2 is an enlarged view of one of shoulder main grooves of FIG. 1.
Figure 3:
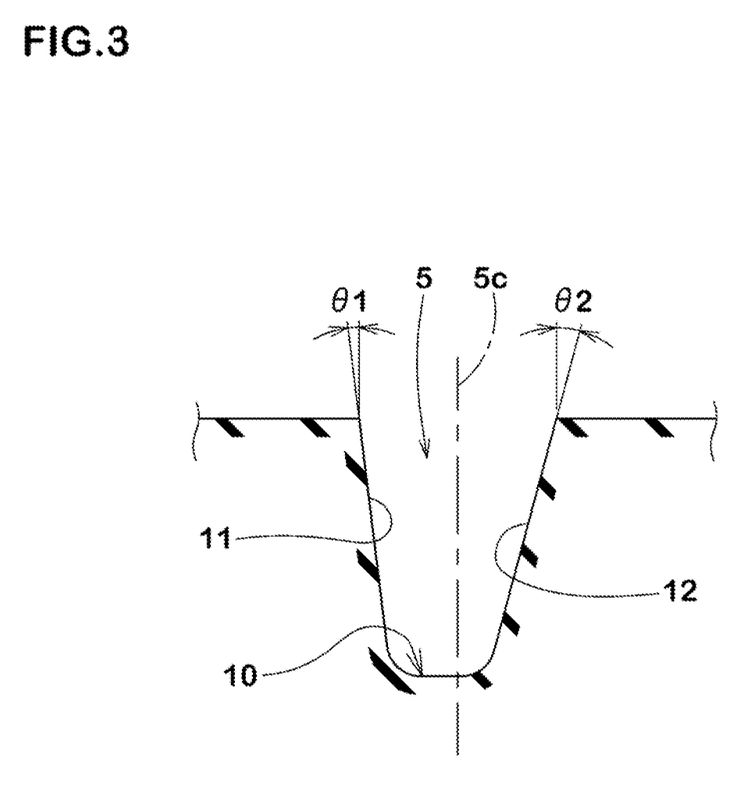
FIG. 3 is an end view taken along A-A line of FIG. 2.

FIG. 2 shows an enlarged view of one of the shoulder main grooves 5 of FIG. 1. FIG. 3 shows an end view taken along A-A line in FIG. 2. As shown in FIGS. 2 and 3, each of the shoulder main grooves 5 has an inner groove wall 11 located on an inner side in the tire axial direction and an outer groove wall 12 located on an outer side in the tire axial direction.

The inner groove wall 11 is formed on an inner side in the tire axial direction of a groove center 5c. The inner groove wall 11 is formed between a groove edge 18 on the inner side in the tire axial direction and a groove bottom surface 10. The outer groove wall 12 is formed on an outer side in the tire axial direction of the groove center 5c. The outer groove wall 12 is formed between a groove edge 19 on the outer side in the tire axial direction and the groove bottom surface 10. The groove center 5c in this specification means an virtual plane extending in a depth direction of the groove through a center position between a pair of the groove edges 18 and 19 in plan view of the tread portion. The inner groove wall 11 and the outer groove wall 12 are each inclined to a direction away from the groove center 5c from the groove bottom surface 10 toward the outside in the tire radial direction in a cross section of the groove. Note that the cross section of the groove is a cross section perpendicular to a longitudinal direction of the shoulder main groove.

Note that in order to make the invention easy to understand, in FIG. 2, the inner groove wall 11 and the outer groove wall 12 are hatched. Further, in FIGS. 1 and 2, an inner groove bottom edge 13 where the groove bottom surface 10 intersects with the inner groove wall 11 of the shoulder main groove 5 and an outer groove bottom edge 14 where the groove bottom surface 10 of the shoulder main groove 5 intersects with the outer groove wall 12 are indicated by a two-dot chain line.

As shown in FIGS. 2 and 3, an angle $\theta1$ of the inner groove wall 11 with respect to a tread normal line of the inner groove wall 11 in the cross section of the groove periodically increases and decreases in the tire circumferential direction. Thereby, the inner groove wall 11 includes concave wall portions 16 concave in a direction away from the groove center of the shoulder main groove 5 and convex wall portions 17 convex in a direction approaching the groove center of the shoulder main groove 5 arranged alternately in the tire circumferential direction. Each of the concave wall portions 16 and the convex wall portions 17 in this embodiment has a smoothly curved outer surface.

Similarly to the inner groove wall 11, an angle $\theta2$ of the outer groove wall 12 with respect to a tread normal line of the outer groove wall 12 in the cross section of the groove also periodically increases and decreases in the tire circumferential direction. Thereby, the outer groove wall 12 includes convex wall portions 22 convex in the direction approaching the groove center of the shoulder main groove 5, and concave wall portions 21 each facing corresponding one of the convex wall portions 17 of the inner groove wall 11 and concave in the direction away from the groove center of the shoulder main groove 5 arranged alternately in the tire circumferential direction. Each of the convex wall portions 22 of the outer groove wall 12 faces corresponding one of the concave wall portions 16 of the inner groove wall 11. Each of the concave wall portions 21 of the outer groove wall 12 faces corresponding one of the convex wall portions 17 of the inner groove wall 11. As a preferred embodiment, each of the concave wall portions 21 and the convex wall portions 22 of the outer groove wall 12 also has a smoothly curved outer surface.

The shoulder main grooves 5 configured as such make it easy for the recessed portions of the groove walls to deform relatively in the tire circumferential direction, therefore, it is possible that the stress concentration at the shoulder land regions 9 is suppressed, and thereby it is possible that occurrence of the cracks in the groove bottoms of the shoulder main grooves 5 is suppress.

As shown in FIG. 3, in any cross section of the shoulder main grooves 5, the angles $\theta2$ of the outer groove walls 12 are larger than the angles $\theta1$ of the inner groove walls 11. The shoulder main grooves 5 configured as such suppress collapse of the shoulder land regions 9 toward the outer side in the tire axial direction over an entire circumference of the tire even during cornering, etc., and therefore, it is possible that the cracks of the groove bottom surfaces of the shoulder main grooves 5 are suppressed.

It is preferred that a minimum value of the angles $\theta2$ of the outer groove walls 12 is, for example, in a range of from 10 to 14 degrees. It is preferred that a maximum value of the angles $\theta2$ is, for example, in a range of from 18 to 22 degrees. It is preferred that the angles $\theta2$ of the outer groove walls 12 periodically varies in a tire circumferential direction within a range of from 12 to 20 degrees, for example. The outer groove walls 12 configured as such can suppress the tear of shoulder land regions 9 without impairing wet performance.

From a similar point of view, it is preferred that a minimum value of the angles $\theta1$ of the inner groove walls 11 is, for example, in a range of from 5 to 8 degrees. It is preferred that a maximum value of the angles $\theta1$ is, for example, in a range of from 9 to 12 degrees. It is preferred that the angles θ1 of the inner groove walls 11 periodically varies in the tire circumferential direction within a range of from 7 to 10 degrees, for example.

It is preferred that the difference between the angles θ2 of the outer groove walls 12 and the angles θ1 of the inner groove walls 11 is, for example, in a range of from 2 to 13 degrees. The outer groove walls 12 and the inner groove walls 11 configured as such are helpful for uniform wear of each of the groove edges 18 and 19 while obtaining the above-mentioned effect.

As shown in FIG. 2, each of the inner groove walls 11 in this embodiment is formed between the groove edge 18 extending straight in the tire circumferential direction on a side of ground contacting surface and the inner groove bottom edge 13 extending in a wavy shape in the tire circumferential direction. The straight groove edge 18 helps to suppress its uneven wear. It can be expected that the inner groove bottom edge 13 extending in a wavy shape disperse stress applied on the groove bottom surface 10.

It is preferred that the inner groove bottom edges 13 extend, for example, in sine-wave shapes. The inner groove bottom edges 13 configured as such can smoothly deform as a whole when the stress is applied to the tread portion 2, therefore, it is helpful for further dispersion of the stress applied to the groove bottom surfaces.

Similarly to the inner groove walls 11, each of the outer groove walls 12 in this embodiment is also formed between the groove edge 19 extending straight in the tire circumferential direction on the side of the ground contacting surface and the outer groove bottom edge 14 extending in a wavy shape in the tire circumferential direction.

The outer groove bottom edges 14 extend in the tire circumferential direction with a same phase as the inner groove bottom edges 13. As a preferred embodiment, the outer groove bottom edges 14 in this embodiment extend in sine-wave shapes in the tire circumferential direction at amplitudes greater than those of the inner groove bottom edges 13. The outer groove bottom edges 14 configured as such can further suppress the tear of the shoulder land regions 9.

As for the inner groove walls 11 and the outer groove walls 12, it is preferred that pitches P1 in the tire circumferential direction of the concave wall portions 16 and 21 or the convex wall portions 17 and 22 are, for example, in a range of from 0.10 to 0.20 times the tread width TW (shown in FIG. 1). Note that each of the pitches P1 is indicated, for example, by a distance between a pair of axially outer peaks 17t of the convex wall portions 17 adjacent in the tire circumferential direction of one of the inner groove walls 11. The concave wall portions 16 and 21 and the convex wall portions 17 and 22 configured as such are helpful for suppressing the tears of the shoulder land regions 9 while maintaining the wet performance.

The concave wall portions 16 of the inner groove wall 11 are provided at axially inner peaks thereof with recess portions 20 locally recessed inwardly in the tire axial direction and having openings at the ground contacting surface of the tread portion 2. The recess portions 20 configured as such provide large spaces on sides of the concave wall portions 16. Thereby, so-called stone biting, which is a state where stones are caught in the shoulder main grooves 5 and remain in the grooves, is effectively suppressed.

In order to further exert the above-mentioned effect, it is preferred that the recess portions 20 extend from the ground contacting surface to the groove bottom surfaces. The recess portions 20 configured as such can expect discharge of stones that have entered a vicinity of the groove bottom surfaces 10.

It is preferred that each of the recess portions 20 includes, for example, a pair of first walls 31 obliquely extending from the inner groove wall 11 in the tire axial direction and a second wall 32 extending in the tire circumferential direction between the pair of the first walls. The recess portions 20 configured as such help to suppress excessive decrease of rigidity of the middle land regions 7.

It is preferred that widths of the recess portions 20 in the tire circumferential direction gradually decrease axially inwardly at least on the ground contacting surface. The widths in the tire circumferential direction of the recess portions 20 in this embodiment gradually decrease axially inwardly over the entire region from the ground contacting surface to the groove bottom surface. The recess portions 20 configured as such can open and close more largely during running, and further, it is possible that the stones are more likely to be discharged.

As shown in FIG. 1, the tread portion 2 is further provided with crown main grooves 6. The crown main grooves 6 are provided on the inner side in the tire axial direction of the shoulder main grooves 5. The crown main grooves 6 in this embodiment are provided on each side of a tire equator C, for example. Alternatively, one crown main groove 6 may be provided on the tire equator C. The crown main grooves 6 have, for example, same groove widths and groove depths as those of the shoulder main grooves 5 described above.

It is preferred that the crown main grooves 6 are, for example, provided with a plurality of protrusions 23 protruding from groove bottom surfaces of the crown main grooves 6 and arranged in the tire circumferential direction. The protrusions 23 configured as such can effectively suppress the stone biting of the crown main grooves 6. Further, in this embodiment, by not providing the protrusions in the shoulder main grooves 5, groove capacity of the shoulder main grooves 5 is secured, therefore, the wet performance is improved, while by providing the protrusions 23 in the crown main grooves 6, the stone biting is certainly suppressed in the crown main grooves 6 to which large ground contact pressure is applied.

The shoulder main grooves 5 and the crown main grooves 6 in this embodiment are provided with a plurality of lug sipes 30 one ends of which are connected to the main grooves and the other ends of which terminate within the land regions. Lengths L1 in the tire axial direction of the lug sipes 30 are, for example, in a range of from 0.5% to 5.0% of the tread width TW. Depths of the lug sipes 30 are, for example, in a range of from 0.70 to 0.80 times the groove depths of the shoulder main grooves 5. The lug sipes 30 configured as such suppress distortion of the groove edges of each of the main grooves at time of ground contacting and therefore help to suppress the uneven wear thereof.

The tread portion 2 is provided with the shoulder main grooves 5 and the crown main grooves 6, therefore, a crown land region 8 is defined in the tread portion 2 in addition to the shoulder land regions 9 located adjacently to the shoulder main grooves 5 on the outer side in the tire axial direction and the middle land regions 7 located adjacently to the shoulder main grooves 5 on the inner side in the tire axial direction. The crown land region 8 is defined between a pair of the crown main grooves 6, for example.

Figure 4:
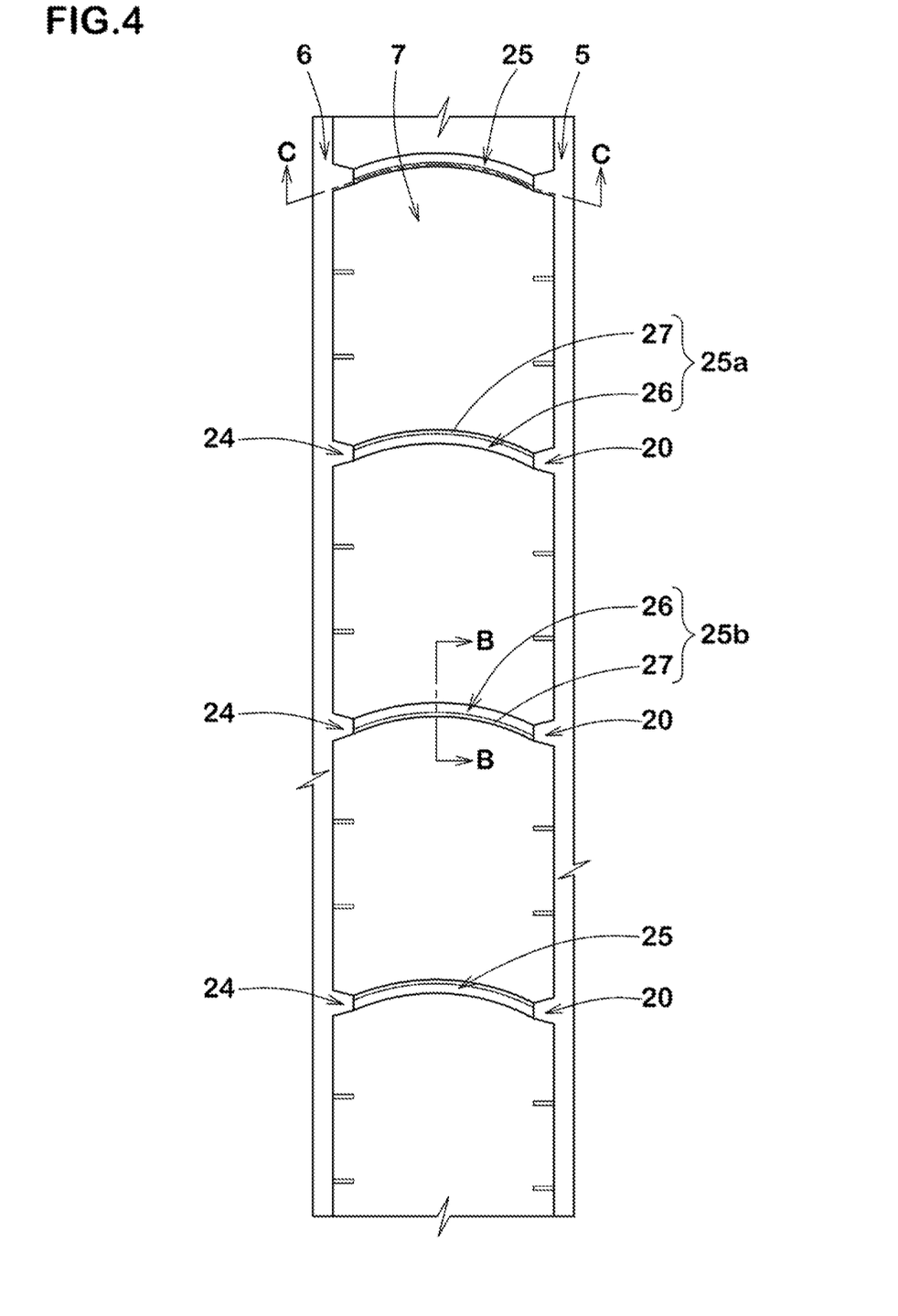
FIG. 4 is an enlarged view of one of middle land regions of FIG. 1.

An enlarged view of one of the middle land regions 7 is shown in FIG. 4. As shown in FIG. 4, the middle land region 7 is provided between the crown main groove 6 and the shoulder main groove 5. The middle land region 7, for example, is provided with the above-described recess portions 20 and a plurality of middle lateral grooves 25 connected to the recess portions 20 and extending between the shoulder main groove 5 and the crown main groove 6. The middle lateral grooves 25 in this embodiment are provided at end portions thereof on a side of the crown main grooves 6 with recess portions 24 similar to the recess portions 20. Thereby, it is possible that the stone biting in the crown main grooves 6 is further suppressed.

In a plan view of the tread portion 2, it is preferred that each of the middle lateral grooves 25 is curved in an arc shape. The middle lateral grooves 25 configured as such disperse stress applied to groove edges thereof and therefore help to suppress the uneven wear of the land region starting from the groove edges.

As shown in FIG. 1, it is preferred that the middle lateral grooves 25 provided in the middle land region 7 on one side of the tire equator C and the middle lateral grooves 25 provided in the middle land region 7 on the other side of the tire equator C in this embodiment are convex in directions opposite to each other. According to such an arrangement of the middle lateral grooves 25, edge effect is exerted regardless of a direction of rotation of the tire.

Figure 5A:
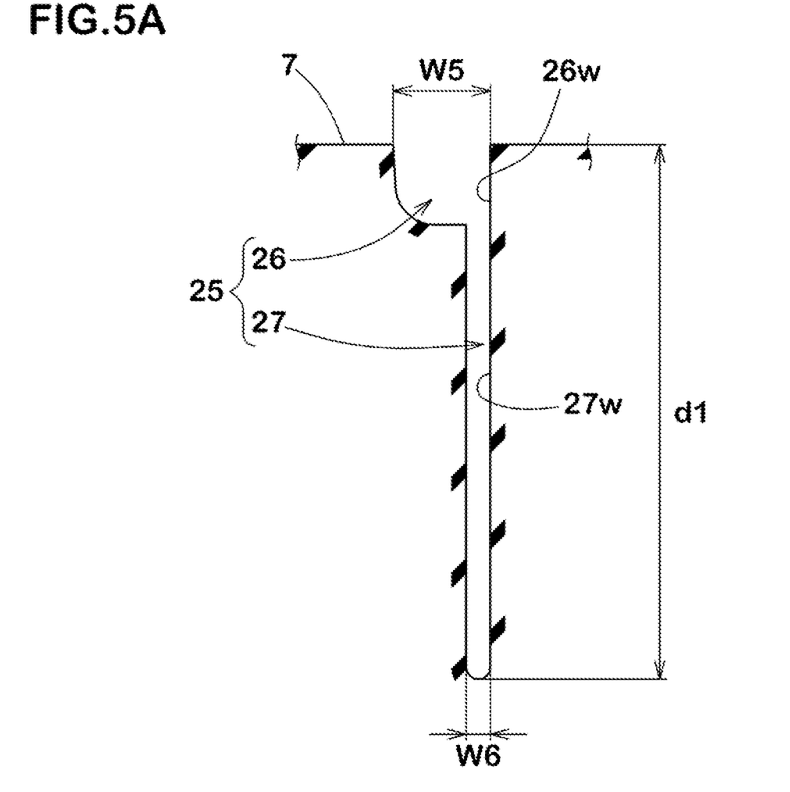
FIG. 5A is a cross-sectional view taken along B-B line of FIG. 4.

A cross-sectional view taken along line B-B of FIG. 4 is shown in FIG. 5A. As shown in FIG. 5A, each of the middle lateral grooves 25 includes a main body portion 26 and a sipe portion 27. The main body portion 26 has an opening on a side of the ground contacting surface of the land region and has a groove width W5 not less than 2.0 mm. The sipe portion 27 extends radially inwardly from a bottom portion of the main body portion 26 with a width W6 smaller than that of the main body portion 26. The width W6 of the sipe portion 27 is, for example, in a range of from 0.5 to 1.5 mm. A depth d1 from the ground contacting surface to a bottom of the sipe portion is, for example, in a range of from 0.50 to 0.60 times the depth of the shoulder main grooves 5.

A sipe wall 27w on one side in the tire circumferential direction of the sipe portion 27 in this embodiment is connected smoothly with a groove wall 26w on the one side in the tire circumferential direction of the main body portion 26, for example.

As shown in FIG. 4, the middle lateral grooves 25 in this embodiment include middle lateral grooves 25a and middle lateral grooves 25b arranged alternately in the tire circumferential direction. In each of the middle lateral grooves 25a, the sipe wall on one side (upper side in FIG. 4) in the tire circumferential direction of the sipe portion 27 and the groove wall on the one side in the tire circumferential direction of the main body portion 26 are connected. In each of the second middle lateral grooves 25b, the sipe wall on the other side (lower side in FIG. 4) in the tire circumferential direction of the sipe portion 27 and the groove wall on the other side in the tire circumferential direction of the main body portion 26 are connected. Thereby, rigidity of each block between the middle lateral grooves 25 is slightly different, therefore, it is possible that impact sound generated when the middle land regions 7 contact with the ground is changed to white noise.

Figure 5B:
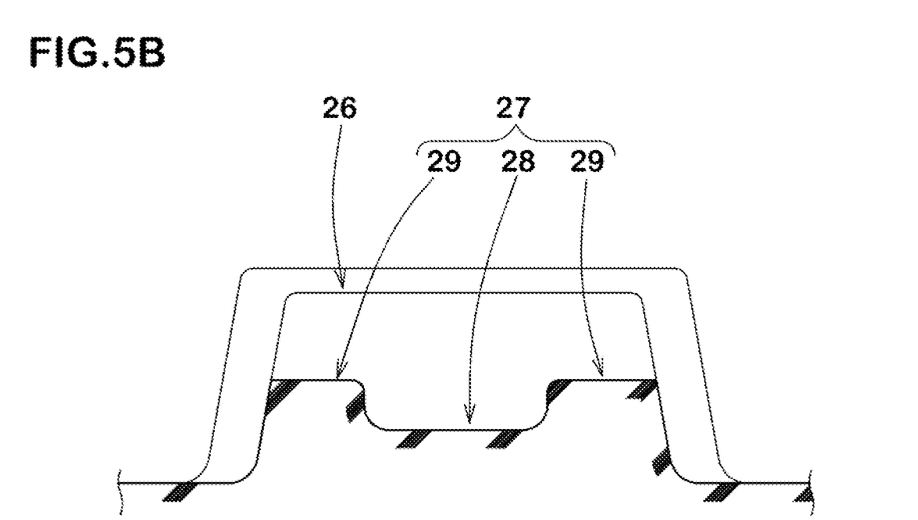
FIG. 5B is a cross-sectional view taken along C-C line of FIG. 4.

A cross-sectional view of the middle lateral groove 25 taken along line C-C in FIG. 4 is shown in FIG. 5B. As shown in FIG. 5B, each of the sipe portions 27 includes a center portion 28 and end portions 29 having different depths from that of the center portion 28. The end portions 29 in this embodiment are disposed on both sides of the center portion 28 and have smaller depths than the center portion 28. Thereby, the sipe portion 27 is suppressed from opening too much, therefore, steering stability is improved.

Figure 6:
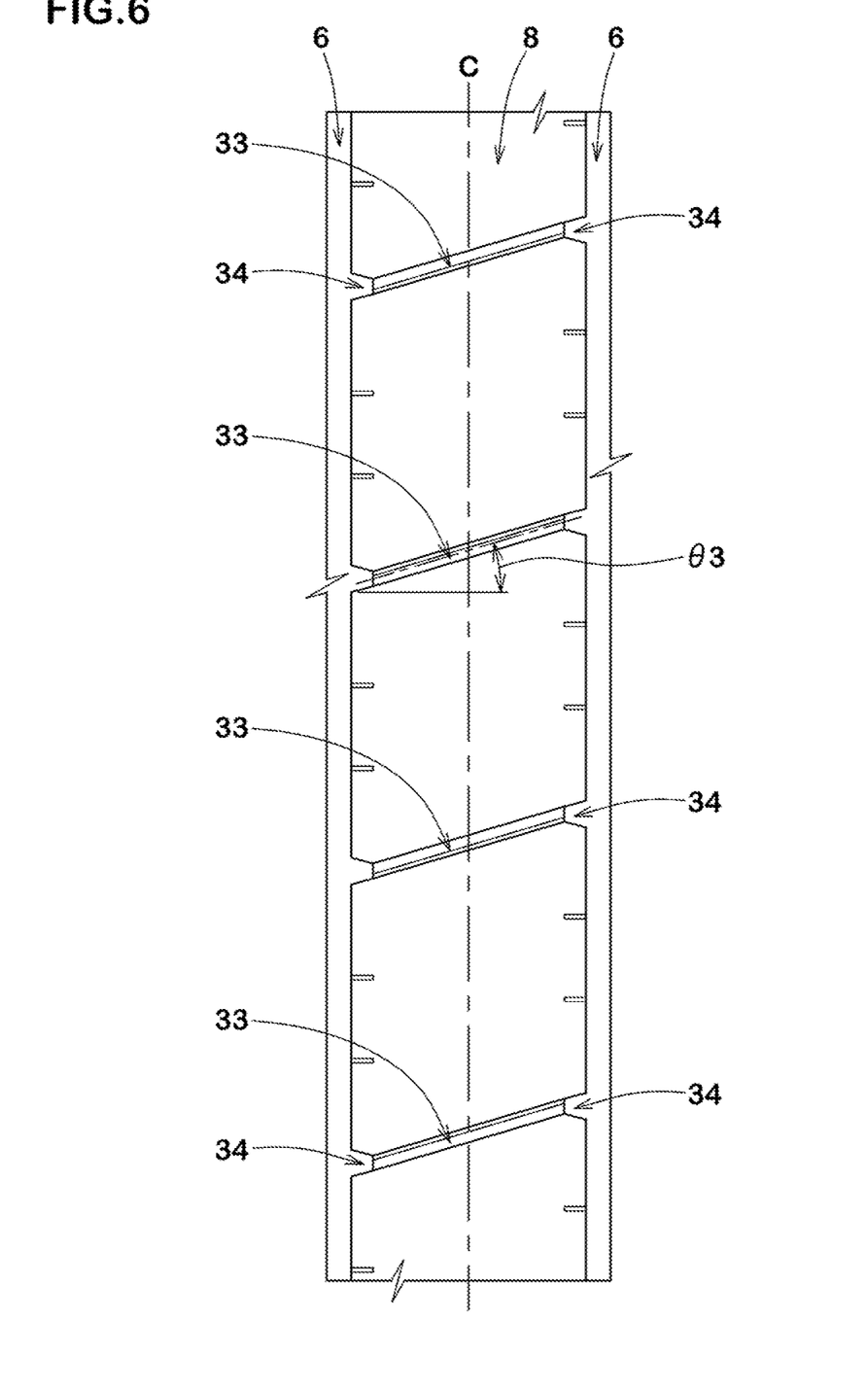
FIG. 6 is an enlarged view of a crown land region of FIG. 1.

An enlarged view of the crown land region 8 of FIG. 1 is shown in FIG. 6. As shown in FIG. 6, the crown land region 8 is provided with a plurality of crown lateral grooves 33. Each of the crown lateral grooves 33 extends between the crown main grooves 6, for example. The crown lateral grooves 33 extend straight and obliquely at angles θ3 in a range of from 10 to 40 degrees with respect to the tire axial direction, for example.

Both end portions of each of the crown lateral grooves 33 are connected with recess portions 34 similar to those described above, for example. Thereby, the stone biting of the crown main grooves 6 is further suppressed.

As a preferred embodiment, the crown lateral grooves 33 in this embodiment have substantially same cross sectional shapes as the middle lateral grooves 25 shown in FIGS. 5A and 5B, for example. That is, the crown lateral grooves 33 include, for example, main body portions having groove widths not less than 2.0 mm and sipe portions extending radially inwardly from bottom portions of the main body portions (not shown).

As shown in FIG. 1, it is preferred that the crown lateral grooves 33 and the middle lateral grooves 25 are misaligned to each other in the tire circumferential direction. The crown lateral grooves 33 and the middle lateral grooves 25 configured as such do not contact with the ground at the same time, therefore, they are helpful in suppressing maximum sound pressure of pumping sound.

As a further preferred embodiment, each of the crown lateral grooves 33 in this embodiment is disposed in a position so as to be smoothly connected via the crown main grooves 6 with the middle lateral grooves 25 disposed on both sides. Thereby, during running on a wet road, water in the crown lateral grooves 33 is likely to be discharged to the outer side in the tire axial direction.

The shoulder land regions 9 are semi-plain ribs not provided with grooves and sipes except for the above-described lug sipes 30. The shoulder land regions 9 configured as such can provide excellent steering stability.

While detailed description has been made of the tire as an embodiment of the present invention, the present invention can be embodied in various forms without being limited to the illustrated embodiment.

WORKING EXAMPLE (EXAMPLE)

Pneumatic tires for heavy duty of size 295/80R22.5 having the basic tread pattern shown in FIG. 1 and the inner groove walls and the outer groove walls of the shoulder main groove shown in FIG. 2 were made by way of test according to the specifications listed in Table 1. As a reference, a tire having the basic tread pattern was made by way of test in which the angles θ1 of the inner groove walls and the angles θ2 of the outer groove walls were equal, and these angles were constant through an entire circumference of the tire. Each of the test tires was tested for tear resistance performance and uneven wear resistance performance. Common specifications, test methods, etc. of the test tires are as follows.

Rim: 22.5×5.25
Tire pressure: 830 kPa
Test car: 10-ton truck loaded 50% of standard load capacity at center of loading platform
Tire mounting position: all wheels
<Tear Resistance Performance>

In order to make the tear occur easily, test tires were kept at 80 degrees Celsius for 5 days, and then used for the test. The test tires were mounted on the test car and the test car was run in steady circular turning until tire temperature became 60 degrees Celsius. Then, the test car was run over a curb with a height of 10 cm at an angle of 10 degrees with respect to its length direction for multiple times, and the number of run over the curb until the tear occurred in the shoulder land regions was counted. The results are indicated by an index based on the reference being 100, wherein the larger the numerical value, the better the tear resistance performance is.

<Uneven Wear Resistance Performance>

Difference in wear amounts between the axially inner groove edges and the axially outer groove edges of the shoulder main grooves were measured after the test car was driven for 48000 km. The results are indicated by an index based on the reference being 100, wherein the smaller the numerical value, the better the uneven wear resistance performance is.

The test results are shown in Table 1.

TABLE 1

|  | Ref. | Ex. 1 | Ex. 2 | Ex. 3 | Ex. 4 | Ex. 5 | Ex. 6 | Ex. 7 |
|---|---|---|---|---|---|---|---|---|
| Minimum value of Angles θ1 of Inner groove walls [degree] | 10 | 7 | 7 | 1 | 5 | 8 | 7 | 7 |
| Maximum value of Angles θ1 of Inner groove walls [degree] | 10 | 10 | 10 | 5 | 9 | 12 | 10 | 10 |
| Minimum value of Angles θ2 of Outer groove walls [degree] | 10 | 12 | 12 | 16 | 12 | 12 | 10 | 14 |
| Maximum value of Angles θ2 of Outer groove walls [degree] | 10 | 20 | 16 | 19 | 20 | 20 | 18 | 22 |
| Range of difference between Angles θ2 and Angles θ1 [degree] | 0 | 2-13 | 2-9 | 11-18 | 3-15 | 2-12 | 2-11 | 4-15 |
| Tear resistance performance [index] | 100 | 118 | 111 | 113 | 116 | 117 | 112 | 118 |
| Uneven wear resistance performance [index] | 100 | 92 | 93 | 98 | 95 | 93 | 91 | 94 |

From the test results, it was confirmed that the tires as the examples exerted excellent tear resistance performance. Further, it was confirmed that the tires as the examples also improved the uneven wear resistance performance.

The invention claimed is:

1. A tire comprising;
   a tread portion comprising a shoulder main groove extending continuously in a tire circumferential direction on a side of a tread edge;
   the shoulder main groove having edges that each extend in the tire circumferential direction and comprising an inner groove wall on an inner side in a tire axial direction and an outer groove wall on an outer side in the tire axial direction;
   the inner groove wall having an angle θ1 with respect to a tread normal line of the inner groove wall in a cross section of the shoulder main groove periodically increasing and decreasing in the tire circumferential direction so that the inner groove wall comprises concave wall portions and convex wall portions arranged alternately in the tire circumferential direction;
   the concave wall portions of the inner groove wall being concave in a direction away from a groove center of the shoulder main groove;
   the convex wall portions of the inner groove wall being convex in a direction approaching the groove center of the shoulder main groove;
   the outer groove wall having an angle θ2 with respect to a tread normal line of the outer groove wall in the cross section of the shoulder main groove periodically increasing and decreasing in the tire circumferential direction so that the outer groove wall comprises convex wall portions and concave wall portions arranged alternately in the tire circumferential direction;
   the convex wall portions of the outer groove wall facing the concave wall portions of the inner groove wall and convex in a direction approaching the groove center of the shoulder main groove;
   the concave wall portions of the outer groove wall facing the convex wall portions of the inner groove wall and concave in a direction away from the groove center of the shoulder main groove; and
   the angle θ2 of the outer groove wall being larger than the angle θ1 of the inner groove wall in any cross section of the shoulder main groove,
wherein
   the shoulder main groove has a groove bottom surface,
   the inner groove wall intersects with the groove bottom surface to form an inner groove bottom edge and the inner groove bottom edge extends in a wavy shape in the tire circumferential direction, and
   the outer groove wall intersects with the groove bottom surface to form an outer groove bottom edge and the outer groove bottom edge extends in a wavy shape in the tire circumferential direction, and
wherein
   the outer groove bottom edge has an amplitude larger than that of the inner groove bottom edge.

2. The tire according to claim 1, wherein, the shoulder main groove edges extend straight in the tire circumferential direction.

3. The tire according to claim 1, wherein, a difference between the angle θ2 and the angle θ1 is in a range of from 2 to 13 degrees.

4. The tire according to claim 1, wherein, the angle θ1 is in a range of from 7 to 10 degrees.

5. The tire according to claim 1, wherein, the angle θ2 is in a range of from 12 to 20 degrees.

6. The tire according to claim 1, wherein,
   the inner groove bottom edge extends in a sine-wave shape, and
   the outer groove bottom edge extends in a sine-wave shape.

7. The tire according to claim 1, wherein, a groove width of the shoulder main groove periodically increases and decreases in the tire circumferential direction.

8. The tire according to claim 1, wherein, in each of the inner groove wall and the outer groove wall, pitches P1 in the tire circumferential direction of the concave wall portions or the convex wall portions are in a range of from 0.10 to 0.20 times a tread width.

\* \* \* \* \*